United States Patent
Han et al.

(10) Patent No.: US 11,320,520 B2
(45) Date of Patent: May 3, 2022

(54) LIDAR PEAK DETECTION USING TIME-TO-DIGITAL CONVERTER AND MULTI-PIXEL PHOTON COUNTER FOR AUTONOMOUS DRIVING VEHICLES

(71) Applicant: Baidu USA LLC, Sunnyvale, CA (US)

(72) Inventors: Yang Han, Sunnyvale, CA (US); Yaoming Shen, Sunnyvale, CA (US); Xiangfei Zhou, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 311 days.

(21) Appl. No.: 16/183,483

(22) Filed: Nov. 7, 2018

(65) Prior Publication Data
US 2020/0142038 A1 May 7, 2020

(51) Int. Cl.
| | |
|---|---|
| G01S 7/486 | (2020.01) |
| G01S 17/93 | (2020.01) |
| G05D 1/00 | (2006.01) |
| G05D 1/02 | (2020.01) |
| G01S 7/4865 | (2020.01) |
| G01S 7/4863 | (2020.01) |
| G01S 17/931 | (2020.01) |
| G04F 10/00 | (2006.01) |

(52) U.S. Cl.
CPC .......... *G01S 7/4865* (2013.01); *G01S 7/4863* (2013.01); *G01S 17/931* (2020.01); *G05D 1/0088* (2013.01); *G05D 1/0248* (2013.01); *G04F 10/005* (2013.01)

(58) Field of Classification Search
None
See application file for complete search history.

(56) References Cited

U.S. PATENT DOCUMENTS

| | | | |
|---|---|---|---|
| 10,556,585 B1 * | 2/2020 | Berger | B60W 30/09 |
| 2018/0252800 A1 * | 9/2018 | Morcom | G01S 17/42 |
| 2018/0356502 A1 * | 12/2018 | Hinderling | G01S 7/4818 |
| 2019/0129009 A1 * | 5/2019 | Eichenholz | H03K 17/0416 |
| 2019/0146071 A1 * | 5/2019 | Donovan | G01S 17/42 |
| | | | 356/5.01 |
| 2020/0133270 A1 * | 4/2020 | Han | G01S 17/931 |
| 2020/0158834 A1 * | 5/2020 | Han | G05D 1/0088 |
| 2020/0166613 A1 * | 5/2020 | Hall | G01S 7/4811 |

* cited by examiner

*Primary Examiner* — Todd Melton
*Assistant Examiner* — Jason R Roberson
(74) *Attorney, Agent, or Firm* — Womble Bond Dickinson (US) LLP (57) ABSTRACT

A LIDAR scanning system uses a combination of a time-to-digital conversion (TDC) device and a multi-pixel photon counter (MPPC) to determine the peak location (time) and magnitude of a reflection of a laser beam off of an object. A configurable trigger threshold of the TDC indicates that a sufficient number of MPPC pixels have triggered that the peak detection module should begin sampling and storing MPPC counts of triggered pixels. When the light received from the reflected laser beam falls below the trigger threshold of the TDC, the MPPC stops sampling the MPPC counts. The peak magnitude of the reflection of the laser beam is determined from the highest sample count of the MPPC. A time at which the peak magnitude occurred is determined as the midpoint of TDC trigger points. The peak magnitude MPPC count is correlated to an intensity value.

15 Claims, 7 Drawing Sheets

LIDAR PEAK DETECTION USING TIME-TO-DIGITAL CONVERTER AND MULTI-PIXEL PHOTON COUNTER FOR AUTONOMOUS DRIVING VEHICLES

TECHNICAL FIELD

Embodiments of the present disclosure relate generally to LIDAR sensors for use with an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

One of the onboard sensors in an autonomous driving vehicle (ADV) is a light detection and ranging ("LIDAR"). LIDAR can be used by an ADV to detect objects surrounding the ADV while driving. LIDAR can also be used to generate and/or update a high-definition map representing objects surrounding the ADV, such as buildings, roadways, signs, trees, and other objects that may appear in a high definition map.

For onboard LIDAR to be effective in detecting objects surrounding the ADV, the scanning for objects must be performed quickly and capture as much information surrounding the ADV as possible. One function of a LIDAR device is to determine the peak location and magnitude of a reflection of a laser beam emitted from the LIDAR device, reflected back to the LIDAR device off of an object being scanned by the LIDAR device. In the prior art, both the peak location (time) and magnitude are often measured using a high-speed analog-to-digital converter (ADC). These ADCs are very expensive, contributing to a high cost of the LIDAR device. In addition, a reflection of an emitted laser beam may have a low intensity if the object is far away (e.g. 100 meters) and has an irregular surface. In contrast, a reflection of an emitted laser beam may have a high intensity if the object being scanned is close (e.g. 10 meters) and has a hard, reflective surface. Prior art detectors, such as PIN diodes and avalanche photodiodes, can have insufficient dynamic range for a high-performance LIDAR device.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments described herein use a low-cost time-to-digital conversion (TDC) device and a multi-pixel photon counter (MPPC), in combination, to overcome the problems of low dynamic range of existing PIN diodes and avalanche photodiodes and the high cost of high-speed analog to digital convertors (ADC) to measure the intensity of the reflection off of a target object of a laser beam emitted from the LIDAR device.

In a first embodiment, a LIDAR device for an autonomous driving vehicle (ADV) includes a laser transmitter, a first sensor that measures a peak magnitude of a reflection of the initial laser beam, and a second sensor that measures a time at which the peak magnitude of the reflection of the initial laser beam occurred. A processing module, coupled to the first sensor and the second sensor, generates LIDAR information from the peak magnitude and a time-of-flight from emitting the initial laser beam to the time at which the peak magnitude occurred. The LIDAR information can be utilized to navigate the ADV responsive to one or more obstacles detected by the LIDAR device. A time at which the peak magnitude occurred can be measured using the second reflected beam. In an embodiment, the first sensor and second sensor can be incorporated into a single sensor. In an embodiment, the second sensor can include a time-to-digital convertor (TDC). A trigger threshold of the TDC can be configured to trigger at a level corresponding to a maximum sensing distance range for the LIDAR device. The time at which the peak magnitude occurred can be determined using a midpoint between a time that the TDC received a leading edge trigger of the reflected initial laser beam and a time that the TDC detected a trailing edge of the reflected initial laser beam. In an embodiment, the leading edge trigger of the TDC occurs when a magnitude of the reflected initial laser beam rises above a trigger threshold of the TDC, and the trailing edge trigger can occur when the magnitude of the reflected initial laser beam falls below the trigger threshold of the TDC. In an embodiment, the first sensor can include a multi-pixel photon counter (MPPC). The magnitude of the peak can be determined at least in part by a count of triggered pixels measured by the MPPC. In an embodiment, the MPPC can include an array of single photon avalanche diodes (SPADs). In an embodiment, the MPPC can include an array of single avalanche photodiodes. In an embodiment, the MPPC can include a CCD camera. The LIDAR device can further include logic to correlate the peak magnitude to an intensity of the reflected initial laser beam.

In second embodiment, an autonomous driving vehicle (ADV) can include the above LIDAR device and a perception and planning system that can receive LIDAR information generated by the LIDAR device to perceive a driving environment surrounding the ADV and to control the ADV to navigate the driving environment.

In a third embodiment, a computer-implemented method can be practiced on a LIDAR device comprising a laser emitter, a first sensor, a second sensor, and a processing module. The method can include emitting an initial laser beam by the laser emitter; measuring, by the first sensor, a peak magnitude of a reflection of the initial laser beam; and measuring, by the second sensor having a configurable trigger threshold, a time at which the peak magnitude of the reflection of the initial laser beam occurred. LIDAR information can be generated from the peak magnitude and a time-of-flight from emitting the initial laser beam to the time at which the peak magnitude occurred. The LIDAR information can be utilized to navigate an autonomous driving vehicle (ADV) responsive to one or more obstacles detected by the LIDAR. In an embodiment, the first sensor comprises a multi-pixel photon counter (MPPC). In an embodiment, the second sensor can be a time-to-digital-conversion (TDC) device. The method can further including correlating a count of the MPPC with an intensity value, and correlating the intensity value and time-of-flight with one or more attributes of an object that reflected the initial laser beam. Measuring the peak magnitude further can include, for each of a plurality of time increments, reading and storing, in association with the time increment, a count of the MPPC. In an embodiment, the reading and storing begins when the reflection of the initial laser beam exceeds a trigger threshold of the second sensor, and ends when the reflection of the initial laser beam falls below the trigger threshold of the second sensor. In an embodiment, the peak magnitude can be determined as the highest MPPC count among the stored MPPC counts for the plurality of time increments.

In a fourth embodiment, any of the above method operations can be performed on a system that includes a memory programmed with executable instructions, the memory coupled to a processing system having at least one hardware processor, the method operations carried out when the instructions are executed by the processing system. A non-transitory computer-readable medium can store executable instructions that, when executed by a processing system having at least one hardware processor, perform any of the above method operations.

Figure 1:
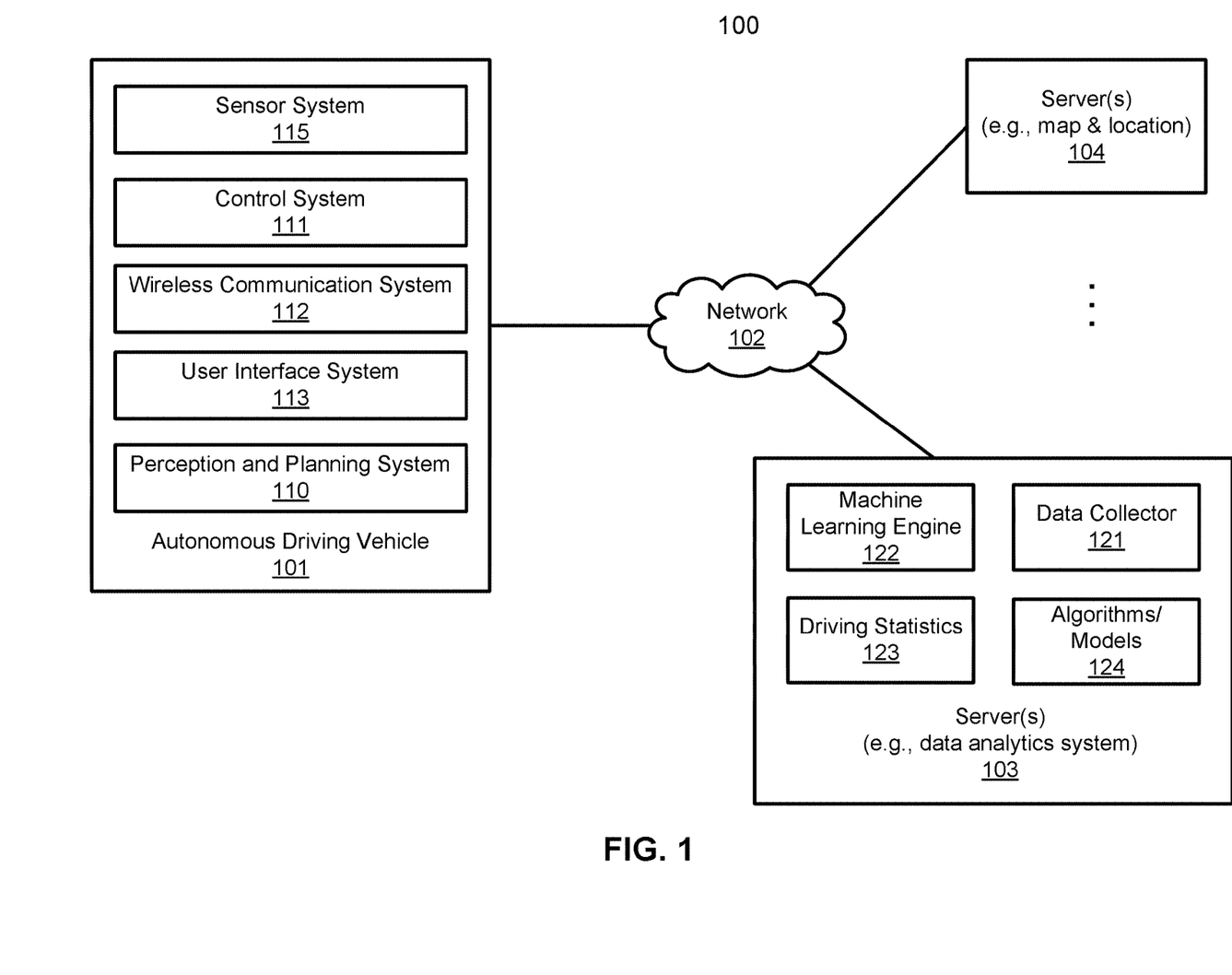
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of network such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous driving vehicle (ADV) 101 refers to a vehicle that can be configured to operate in an autonomous mode in which the vehicle navigates through an environment with little or no input from a driver. Such an autonomous driving vehicle can include a sensor system 115 having one or more sensors that are configured to detect information about the environment in which the ADV 101 operates. The ADV 101 and its associated controller(s) use the detected information to navigate through the environment. Autonomous driving vehicle 101 can operate in a manual mode, a full autonomous mode, or a partial autonomous mode. In a manual mode, the ADV 101 can be operated by a human driver with little, or no, assistance for logic onboard the autonomous vehicle. In full autonomous mode, the ADV 101 can be operated using little, or no, human driver assistance. In partial autonomous mode, ADV 101 can be operated with some or all driving logic subsystems active, and a human driver providing some driving control inputs.

In one embodiment, autonomous driving vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
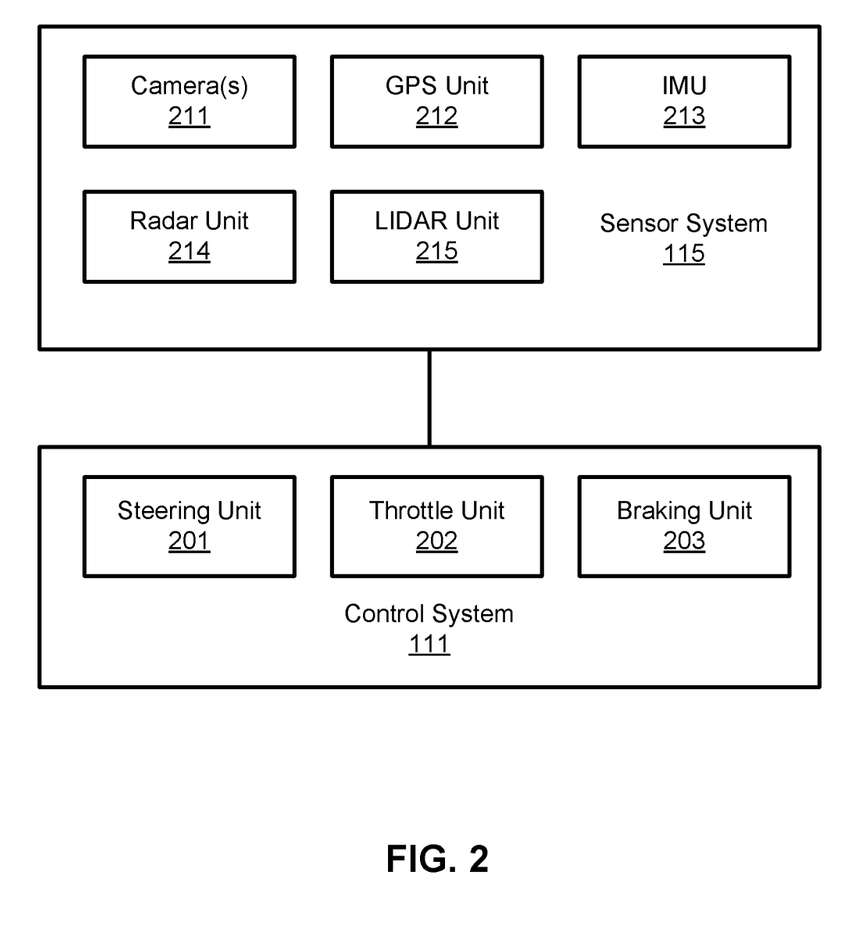
FIG. 2 is a block diagram illustrating an example of an autonomous driving vehicle (ADV) according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. LIDAR sensor 215 can include a plurality of sensor types to perform the task of detecting a peak magnitude of a reflected initial laser beam, reflected off of an object surrounding the autonomous vehicle, and a time at which the peak magnitude of the reflected initial laser beam occurred. In an embodiment, a time-to-digital-conversion (TDC) device can be programmed with a configurable trigger level. A multi-pixel photon counter (MPPC) can begin counting the number of pixels get triggered due to the reflected initial laser beam when an amount of light received creates a voltage above the trigger threshold. The MPPC can stop counting number of triggered pixels when the voltage created by reflected initial laser beam falls below the TDC trigger threshold. A highest MPPC pixel count can represent the peak magnitude of the reflected initial laser beam. A midpoint between the time that the TDC is triggered and the time that the TDC ceases to be triggered can be the time at which the peak magnitude was detected. The MPPC can include an array of single photon avalanche diodes (SPADs). Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

Sensor system 115 can detect obstacles to a path of an ADV. Such obstacles can be taken into account by a least cost path module that emulates human driving behavior.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof. Steering unit 201 can be controlled, at least in part, by a least cost path module that participates in determining a path for navigating the ADV along a route.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Data collector 121 may further receive LIDAR information from a LIDAR device in the sensor system 115 of the autonomous vehicle control system. LIDAR information may be transmitted to server 103 to update a high-definition (HD) map of objects surrounding the autonomous vehicle.

In an embodiment, data collector 121 can record data comprising driving statistics 123 for an initial path for a portion of an ADV route, and a selected least cost path for the portion of the route. An initial path can be, for example, a path that follows a centerline of a lane of roadway. Driving statistics 123 can also include sensor data and control input data associated with the ADV while it drives along a path along the route. Driving statistics 123 for a path along the route can include speed, heading, steering input, braking input, if any, and sensor data including lateral forces, acceleration, and braking forces, and the like, such as may affect passenger comfort as the ADV drives along a path. Machine learning engine 122 can use driving statistics 123 to generate algorithms and models 124 that can be used to upgrade ADV driving logic.

Algorithms 124 can then be uploaded on ADVs to be utilized during autonomous driving in real-time. In an embodiment, ADVs 101 can upload driving statistic data to server(s) 103 to facilitate crowd-sourced learning of algorithms and models 124 that can be downloaded to an ADV. For example, machine learning 122 can determine speed vs. steering input relationships that affect passenger comfort, wherein the speed and steering input are both within acceptable limits, but passenger comfort detected by IMUs or roll-pitch indicate levels that affect passenger comfort.

Figure 3:
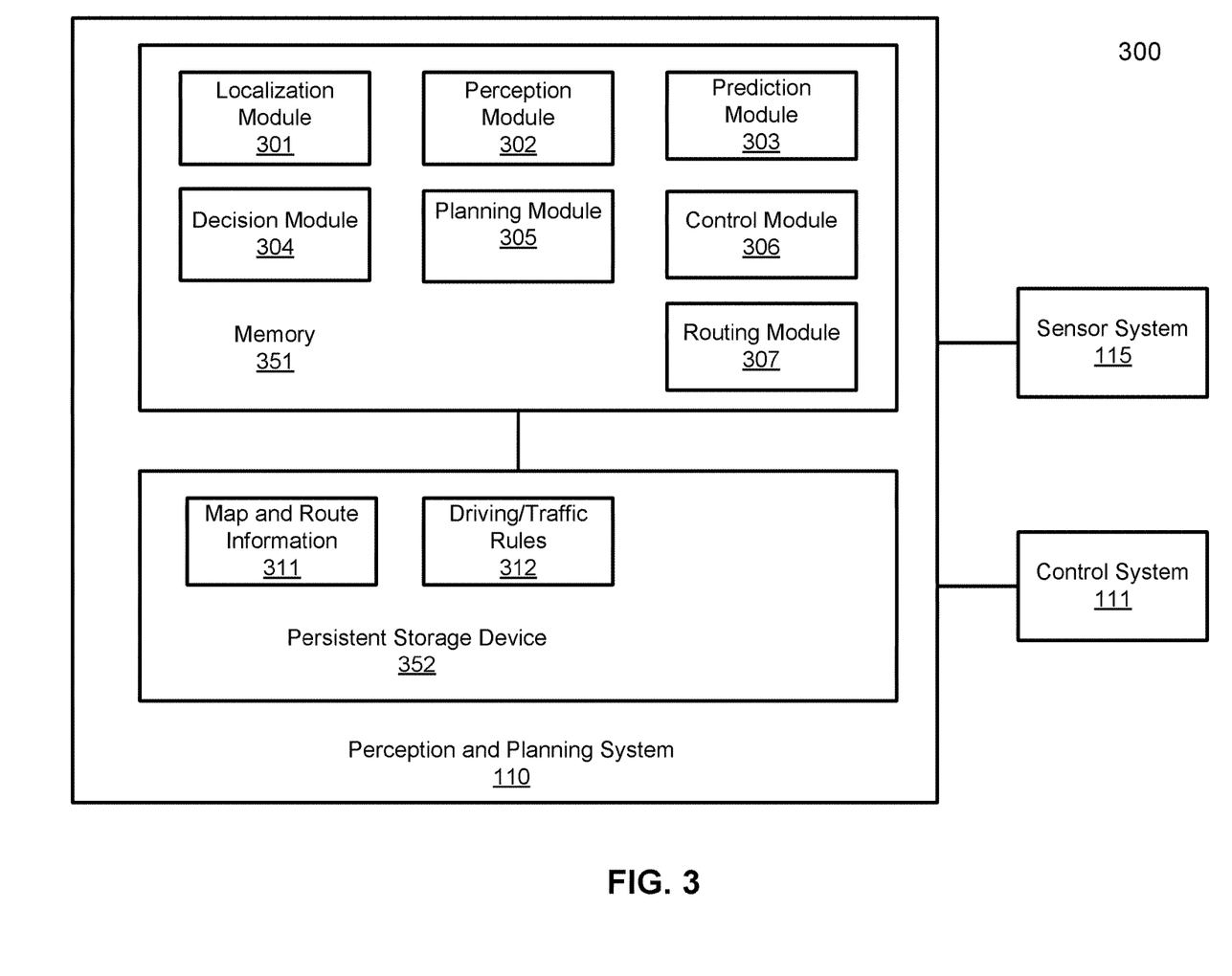
FIG. 3 is a block diagram illustrating an example of a perception and planning system used with an ADV according to one embodiment

FIG. 3 is a block diagram illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR. A LIDAR device can include a LIDAR peak detector that utilizes a plurality of sensors to perform peak detection, as described further below. The plurality of sensors can include a time-to-digital-conversion (TDC) device and a multi-pixel photon counter (MPPC), as further described below.

For each of the objects, prediction module 303 predicts what the object will behave under the circumstances. The prediction is performed based on the perception data perceiving the driving environment at the point-in-time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4A:
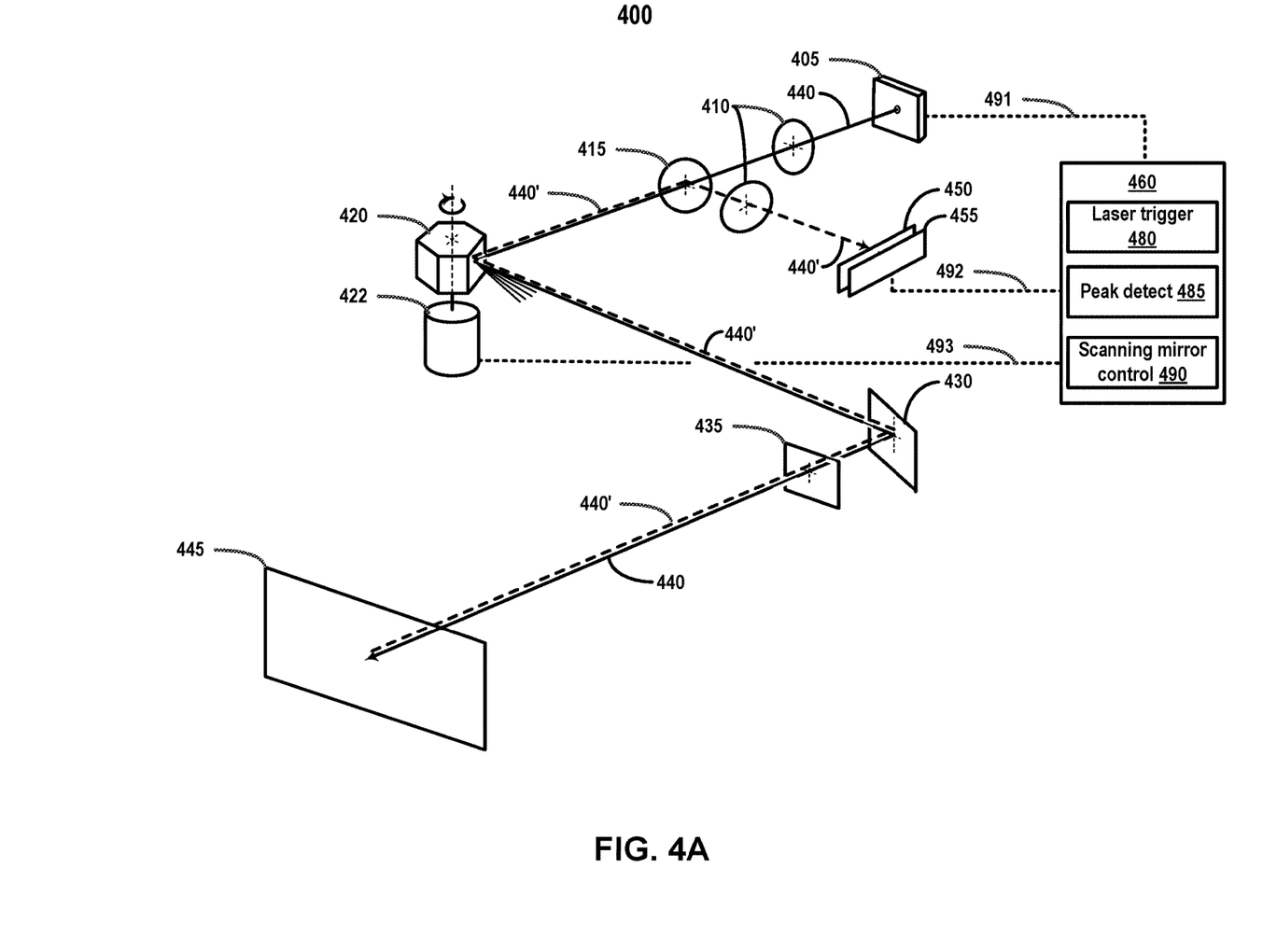
FIGS. 4A and 4B are block diagrams illustrating a LIDAR sensor system that incorporates peak detection using a multi-pixel photo counter and a time-to-digital conversion device, for use with a LIDAR system in an ADV, according to one embodiment.
Figure 4B:
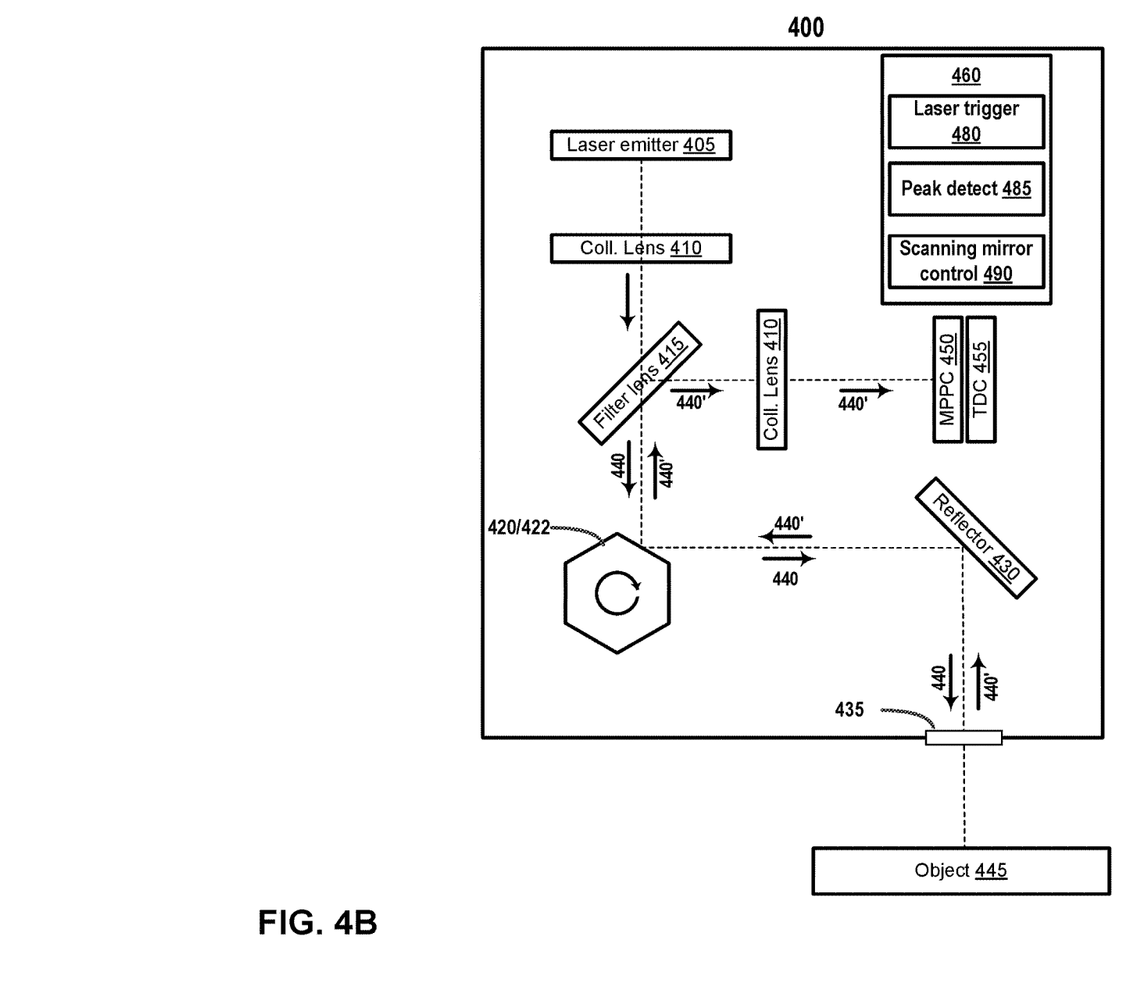

Referring now to FIGS. 4A and 4B, in an embodiment, a LIDAR sensor system 215 can include LIDAR device 400. In an embodiment, LIDAR device 400 can include laser emitter 405, multi-pixel photon counter (MPPC) 450, and time-to-digital-conversion (TDC) device 455, interconnected with a controller 460. FIG. 4A illustrates an example optical path that incorporates the laser emitter 405, MPPC 450, and TDC 455. FIG. 4B illustrates a top view of a layout of components corresponding to FIG. 4A. The components shown are by way of illustration. More, or fewer, components may be used to implement a dual-sensor (MPPC and TDC) method of detecting a time and a magnitude of a peak of a reflected laser beam. In an embodiment, MPPC 450 and TDC 455 can be integrated into a single component.

A multi-pixel photon counter (MPPC) 450 can comprise an array of single photon avalanche diodes (SPADs). A single photon avalanche diode (SPAD) is a digital device having a very large gain, such as $10^6$ gain. The output of a SPAD is binary: if the SPAD does not detect any photons, the output is "0". In the presence of light, the SPAD has a probability of outputting a "1" that is dependent upon the intensity of the light received. Since the internal gain of the SPAD is very large, the dynamic range of intensity of light that can trigger the SPAD is quite large. The MPPC output is the linear summation of all individual SPAD outputs.

MPPC 450 can receive a pulse of light, such as a reflection 440' of a laser beam 440 emitted by a LIDAR laser emitter 405. When light is received by MPPC 450, a number of SPADs will trigger that is dependent upon the intensity of light received. Over the duration of time that the pulse of light of reflected laser beam 440' is received, the output of the MPPC 450 will vary based on the intensity of the pulse at any moment in time. MPPC 450, alone, can determine a peak magnitude of the received light pulse, but not the time at which the peak magnitude of the pulse occurred. The time at which the peak magnitude occurred can be determined by a time-to-digital-conversion (TDC) device 455.

A time-to-digital conversion (TDC) device 455 can be configured to trigger at a configurable threshold of a signal received from MPPC 450. The trigger threshold can be chosen to represent a maximum scanning distance for the LIDAR device 400. MPPC 450 receives the pulse of light of reflected laser beam 440', and begins outputting an analog signal, e.g. current or voltage signal, to TDC 455 based on the number of triggered SPADs (pixels), and the amplitude of output from each pixel in the MPPC 450. TDC 455 will trigger at the configured threshold, indicating a time $t_0$ at which a rising edge of the pulse of light of reflected laser beam 440' is received by MPPC 450. A peak detection module 485 in controller 460 can begin sampling the output of MPPC 450 to determine the peak magnitude of the signal output from MPPC 450, relative to the time $t_0$ of the rising edge trigger of TDC 455. A time, $t_{peak}$, at which the peak magnitude of the received reflection 440' of the laser beam 440 occurred, can be determined from a time at which the laser beam 440 was emitted, the time $t_0$ at which the TDC 455 was triggered by the analog output from MPPC 450, a sample rate at which the peak detection module 485 samples MPPC 450 output, and the sample number, i, at which the peak magnitude of the MPPC 450 output signal was detected. In an embodiment, sampling of the MPPC 450 output can start at time $t_0$ and stop at a time $t_n$. Time $t_n$ represents the time when the signal received from MPPC 450 by TDC 455 falls below the trigger threshold of TDC 455. In an embodiment, sampling of MPPC 450 output can stop when the signal magnitude received by TDC 455, from MPPC 450, falls below the configured trigger threshold for the TDC 455. In an embodiment, the peak magnitude can be determined, by the peak detection module 485, by generating a histogram of the magnitude of samples of the MPPC 450 between $t_0$ and $t_n$, and determining the peak magnitude as the highest MPPC 450 signal which occurred most frequently during the sample period. In embodiment, the received reflected laser beam pulse 440' can be assumed to be substantially symmetric, such that the time at which the peak magnitude occurs is determined to occur at the midpoint between $t_0$ and $t_n$. The peak magnitude of the reflected laser beam 440' can be correlated to an intensity of the reflected laser beam 440'.

Referring to FIG. 4A, an example optical path for the LIDAR device begins with laser emitter 405 emitting an initial laser beam 440, and subsequent laser beams 440 ("laser beam"). Laser beam 440 can be reflected off of an object 445 as reflected laser beam 440'. Reflected laser beam 440', and subsequent reflected laser beams 440', are received by TDC 455 and MPPC 450. A peak detection module 485 in controller 460 can detect a time at which a peak magnitude of the reflected laser beam 440' occurred, relative to the laser beam 440 being emitted, and a peak magnitude of the reflected laser beam 440'. In an embodiment, laser emitter 405 emits an initial laser beam ("laser beam") 440. The laser beam 440, emitted by laser emitter 405, can pass through a collimating lens 410 to ensure that the emitted laser beam 400 is substantially collimated. Next, the collimated laser beam 440 can pass through a filtering lens 415. In an embodiment, filter optic 415 can be a 50% transmissive-50% reflective optic, such that 50% of the collimated laser beam 400 passes through filter optic 415, toward a scanning mirror 420, and 50% of the collimated beam does not. The portion of laser beam 440 that passes through filter optic 415 to scanning mirror 420 can be reflected by scanning mirror 420 to a reflector 430, and then exit LIDAR device 400 through an aperture 435. Laser beam 440 then continues to an object 445 to be scanned.

Object 445 reflects the laser beam 440 as reflected laser beam 440'. Reflected laser beam 440' enters LIDAR device 400 through aperture 435, to reflector 430. Reflector 430 reflects the reflected beam 440' to scanning mirror 420. Scanning mirror 420 reflects the reflected laser beam 440' to filter optic 415. As described above, filter optic 415 can be a 50% transmissive-50% reflective lens. Filter optic 415 reflects the reflected laser beam 440' toward TDC 455 and MPPC 450. In an embodiment, reflected laser beam 440' passes through a collimating lens 410 on the way to TDC 455 and MPPC 450.

Scanning mirror control module 490 of controller 460 can send position and control signals to scanning mirror motor 422 via communication line 493. In an embodiment, a sequence of laser emissions and scanning can include the following operations: scanning mirror control 490 positions scanning mirror 420 with control signals to scanning mirror motor 422, laser trigger module 480 triggers laser emitter 405 to emit a laser beam 440; MPPC 450 receives reflected beam 440' off of object 445; MPPC 450 receives an intensity of light that generates an analog signal to TDC 455; analog signal received by TDC 455 from MPPC 450 rises above a configurable trigger threshold value of TDC 455, at time $t_0$; peak detection module 485 begins sampling MPPC 450 triggered pixel counts and/or an analog signal received from MPPC 450, and continues sampling and storing samples from MPPC 450 until the signal received by TDC 455 from MPPC 450 falls below the trigger threshold, thereby establishing the time $t_n$, indicating the end of the sampling period $t_0$ to $t_n$; peak detection module 485 determines a time and a magnitude of a peak intensity of reflected laser beam 440'; processing module of microcontroller 460, together with peak detection module 485, correlates the peak magnitude with a light intensity value, and determines a time-of-flight of the laser beam from the time that the laser beam 440 was emitted until the time $t_{peak}$ that the peak magnitude of the reflected laser beam 440' occurred; and processing module of controller 460 transmits the peak magnitude, intensity, and time of flight as LIDAR information to a perception and planning module 110 of the autonomous driving vehicle ADV. This process then repeats.

Controller 460 can include a processing module that coordinates laser trigger 480 and peak detector 485 to determine, for each emitted laser beam 440, detection of a peak magnitude of the reflected laser beam 440' detected by TDC 455, MPPC 450, and peak detection module 485. Scanning mirror control module 490 can control, via communication line 493, scanning mirror motor 422 to effect a rotation of scanning mirror 420 such that emitted lasers beams 440 reflect off of scanning mirror 420 as scanning lines in a plane. A processing module of controller 460, laser trigger module 480, and peak detect module 485 can also determine a time-of-flight from when the laser beam 440 is emitted to the time when the peak magnitude of the reflected laser beam 440' is detected. Processing module of controller 460 and laser trigger module 480 can send a signal to emit a next laser beam via communication line 491. Peak detection module 485 can receive TDC 455 trigger information and MPPC 450 count and/or signal information via communication line 492. Processing module of controller 460 can correlate the time-of-flight to the peak magnitude to a distance of the object 445 from the LIDAR device 400. Controller 460 can also correlate the distance of the object 445 from the LIDAR device 400 with the peak magnitude to determine properties of the object 445. LIDAR information can include at least the distance to the object 445 and the properties of the object 445. LIDAR information is passed to the perception and planning system 110 to help determine one or more objects surrounding the ADV, for purposes of navigating the ADV.

Controller 460 can include a processor, memory, storage, one or more communication interfaces, a display, one or more input devices, one or more input/output (I/O) channels, one or more analog to digital convertor channels, one or more timer channels, an interrupt controller, and other components of a computing system. The processor may include one or more hardware processors which may include a central processing unit, a graphics processing unit, mathematical co-processor, or pipelined processor. Executable instructions may be stored on one or more non-transitory non-volatile storage devices. Communications interfaces can include WiFi, Ethernet, I²C, USB, RS485, etc. Memory can be read-only memory (ROM), random access memory (RAM), flash memory, static memory, and the like.

Controller 460 can include one or more input device(s) such as a mouse, a touch pad, a touch sensitive screen (which may be integrated with display device, a pointer device such as a stylus, and/or a keyboard (e.g., physical keyboard or a virtual keyboard displayed as part of a touch sensitive screen). For example, input device may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Input/Output (I/O) devices may include an audio device. An audio device may include a speaker and/or a microphone to facilitate voice-enabled functions, such as voice recognition, voice replication, digital recording, and/or telephony functions. Other I/O devices may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. I/O devices may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect via a sensor hub (not shown), while other devices such as a keyboard or thermal sensor may be controlled by an embedded controller (not shown), dependent upon the specific configuration or design of system.

Computer-readable storage medium may be used to store the some software functionalities described above persistently. While computer-readable storage medium is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Note that some or all of the components as shown and described above may be implemented in software, hardware, or a combination thereof. For example, such components can be implemented as software installed and stored in a persistent storage device, which can be loaded and executed in a memory by a processor to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
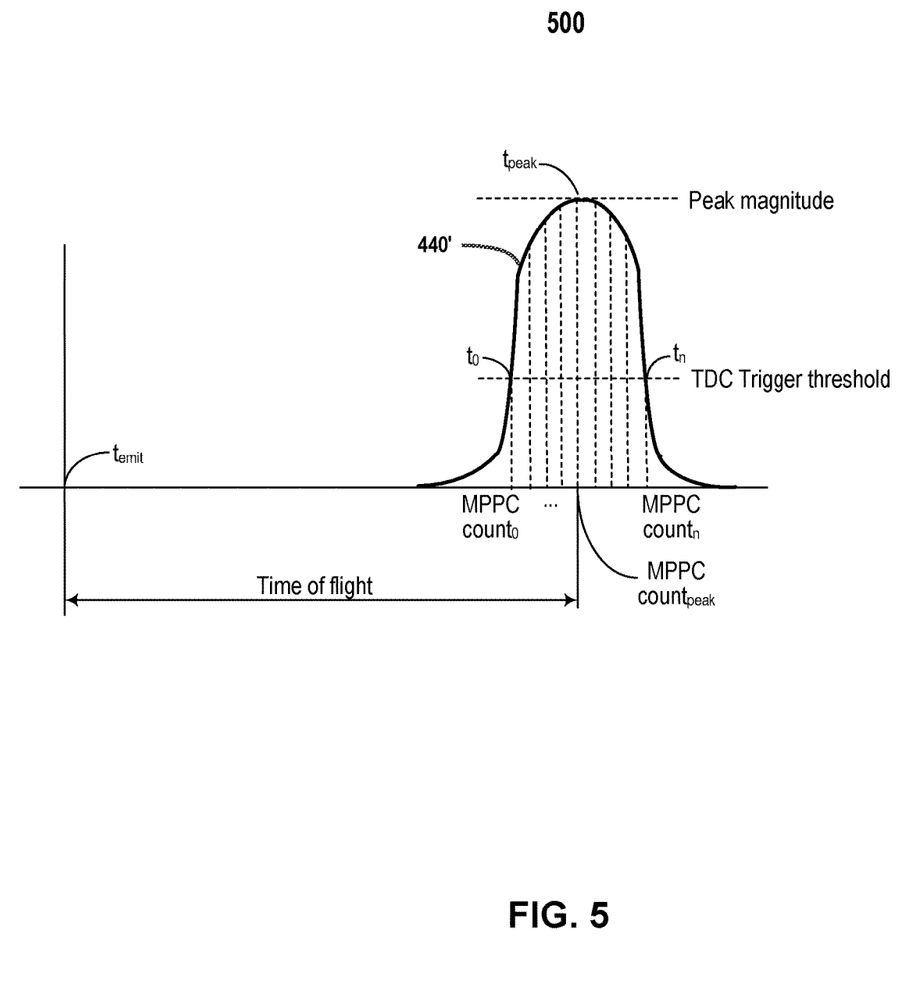
FIG. 5 illustrates an example reflected pulse of an initial laser beam, reflected off of an object scanned by a LIDAR system of an ADV, according to one embodiment.

FIG. 5 illustrates, in block diagram form, detection of a peak magnitude and time of flight, from the time that a laser beam 440 was emitted, to the peak magnitude of a reflection of the laser beam 440' off of an object 445 occurred. A laser beam 440 is emitted at time $t_{emit}$. The laser beam 440 is reflected off of an object 445, back toward the LIDAR device 400. Reflected laser beam 440' is received by TDC 455 and MPPC 450. When MPPC 450 receives light from reflected laser beam 440', an amount of pixels in MPPC 450 is triggered, based upon the intensity of the received light. MPPC 450 sends, to TDC 455, an analog signal which is determined by the percentage or count of the pixels triggered. When the analog signal received by TDC 455 reaches a configurable threshold of TDC 455, TDC 455 outputs a trigger signal to peak detection module 485. This rising edge time at which TDC 455 is triggered is time $t_0$. At time $t_0$, peak detection module 485 begins sampling an output of MPPC 450 comprising a count of triggered pixels and/or an analog signal representing the count or percentage of triggered pixels of MPPC 450. Since the output of the MPPC is the summation of individual SPAD outputs, the more pixels that are triggered, the higher the output voltage. The samples are stored with relation to an order in which the samples are taken. For example, MPPC count$_0$ is sampled and stored in relation to time $t_0$. For each sample, i, sampled and stored by peak detection module 485, the sample MPPC count$_i$ is stored in relation to a time $t_i$ representing sample i. Peak detection module 485 continues sampling the count and/or analog signal received from MPPC 450 until the signal received by TDC 455 from MPPC 450 falls to a level below the configurable threshold for TDC 455. This is time $t_n$. Then, peak detection module 485 determines a peak magnitude of the stored samples, and a time at which the peak magnitude occurred relative the time of emission of the laser beam 440.

Peak detection module 485 uses samples MPPC count$_0$ through MPPC count$_n$ to determine a peak magnitude of the reflected laser beam 440' and a time (sample number), $t_{peak}$, between $t_0$ and $t_0$ at which the peak magnitude occurred. Peak detection module 485 can also receive the time $t_{emit}$ from laser trigger module 490. Peak detection module 485 can then determine a time of flight from $t_{emit}$ to $t_{peak}$ at which the peak magnitude of reflected laser beam 440' occurred. The time $t_{peak}$, relative to $t_0$, can be determined using the sample number MPPC count$_{peak}$ and the sample rate of MPPC 450. Peak detection module 485 and/or processing module of controller 460 can correlate MPPC count of the peak magnitude with an intensity of the reflected laser beam 440' and determine a distance at which the object 445 is away from LIDAR device 400 using the time of flight. Processing module of controller 460 can transmit the peak magnitude, time of flight, and intensity as LIDAR information associated with laser beam 440, to perception and planning system 110 of the ADV. Perception and planning module 110 can determine one or more objects surrounding the ADV and navigate the ADV along a driving path that takes the objects into account.

Figure 6:
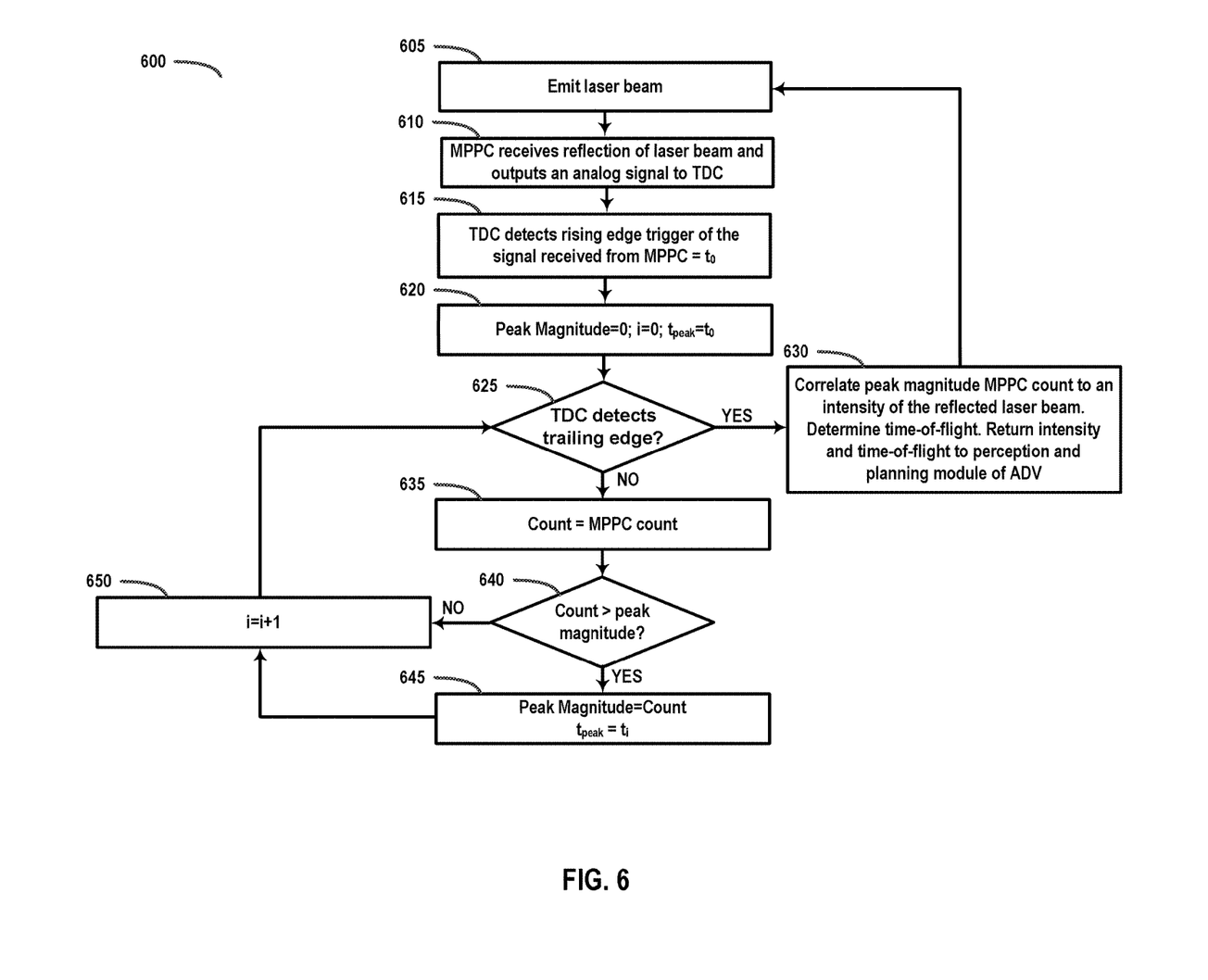
FIG. 6 illustrates a method of determining a peak magnitude, and a time at which the peak magnitude occurs, of a reflection of an initial laser beam reflected off of an object scanned by a LIDAR system of an ADV, according to some embodiments.

FIG. 6 illustrates a method 600 of determining a peak magnitude, and a time at which the peak magnitude occurs, of a reflection 440' of an initial laser beam 440 reflected off of an object 445 scanned by a LIDAR system of an ADV, according to some embodiments. An example reflected laser beam 440' pulse is described with reference to FIG. 5, above.

In operation 605, laser emitter 405 can emit an initial laser pulse 440 from LIDAR device 400. Method 600 can be repeated numerous times to scan an object 445. A representative beam path for directing the initial laser beam 440 to an object 445, and for the LIDAR device to receive and process a reflection 440' of the laser beam 400 off of the object 445, is described above with reference to FIGS. 4A and 4B.

In operation 610, multi-pixel photon counter (MPPC) 450 can receive the reflected laser beam 440'. MPPC 450 generates an output analog signal based upon a number of pixels in MPPC 450 that have been triggered. A pixel triggers based on an intensity of light received by the pixel. Each triggered pixel can output a signal (current or voltage) such that the output analog signal represents a sum (a count) of the triggered pixels. MPPC 450 can maintain an internal counter that numerically sums the number of triggered pixels. MPPC 450 outputs the analog signal to TDC 455.

In operation 615, the output signal from MPPC 450 can be received by time-to-digital conversion (TDC) device 455. TDC 455 can be configured to trigger upon receiving a threshold amount of light from a reflection 440' of an emitted laser beam 440 emitted from laser emitter 405. When the amount of light received by TDC 455 from MPPC 450 reaches the trigger threshold of TDC 455, a trigger signal can be sent to peak detection module 485 to begin sampling the output of MPPC 450. Peak detection module 485 can sample either, or both, the MPPC count and the MPPC analog signal that is output to TDC 455. The time of the trigger is $t_0$.

In operation 620, at time (i.e., sample number) $t_0$, a variable PeakMagnitude is initialized to 0. A sample number counter is initialized to 0. A sample number at which the peak magnitude of the reflected laser beam 440' occurs, $t_{peak}$, is set to 0.

In operation 625, it can be determined whether the output signal from MPPC 450 has fallen below the configured threshold for TDC 455. If so, this is the trailing of the signal received from MPPC 450, and method 600 continues at operation 630. Otherwise method 600 continues at operation 635.

In operation 630, the value in variable PeakMagnitude can be correlated by peak detection module 485 to an intensity of the reflected laser beam 440' at a time $t_{peak}$. Peak detection module 485 can also determine a time-of-flight from the emitting of the initial laser pulse 440 to the time at which the peak magnitude of the reflected initial laser pulse 440' occurred. Peak detection module 485 and/or processing module of controller 460 can return the intensity, peak magnitude, and time-of-flight as LIDAR information to perception and planning system 110. Perception and planning system 110 can utilize the LIDAR information to determine an environment surrounding the ADV and can navigate the ADV along a driving path while taking the environment surrounding the ADV into account. Method 600 then continues at operation 605, wherein another laser beam 440 is emitted.

In operation 635, the current MPPC 450 output can be sampled by peak detection module 485 and stored in a variable Count. The sample can be a sample of the analog out of MPPC 450, or a count of triggered pixels generated by MPPC 450.

In operation 640, it can be determined whether sampled MPPC 450 output in the variable Count is greater than the sampled MPPC 450 output in variable PeakMagnitude. If so, then method 600 continues at operation 645. Otherwise method 600 continues at operation 650.

In operation 645, variable PeakMagnitude can be set to Count, the current sample of MPPC 450 output. Time (sample number) $t_{peak}$ can be set to $t_i$, the $i^{th}$ sample of the output of MPPC 450. Method 600 continues at operation 650.

In operation 650, the sample increment variable, i, can be incremented by 1. Method 600 resumes at operation 625, where it is determined whether the amount of light from the reflected laser beam 440' has fallen below the trigger threshold for TDC 455.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A LIDAR device for an autonomous driving vehicle (ADV), comprising:
   a laser transmitter to emit an initial laser beam;
   a time-to-digital conversion (TDC) device to be triggered at a trigger threshold;
   a multi-pixel photon counter (MPPC) having an array of single photon avalanche diodes (SPADs), each SPAD having an output of 0 or 1, wherein each SPAD in the array of SPADs has a probability of outputting a 1 that is dependent upon an intensity of light received and a configured trigger level corresponding to a maximum sensing distance range for each SPAD in the array of SPADs, wherein the MPPC is to output an analog signal corresponding to an MPCC count representing a summation of an output of 0's and 1's of all SPADs in the MPPC for each reflected pulse of the initial laser beam, and starts sampling and storing the MPCC count when the analog signal exceeds the trigger threshold of the TDC device to trigger the TDC device and stops sampling and storing the MPCC count when the analog signal falls below falls below the trigger threshold, wherein the MPPC is to determine a highest MPPC count of the sampled and stored MPPC counts as a peak magnitude of a reflection of the initial laser beam, wherein the TDC device is to determine a time of the peak magnitude of the reflection of the initial laser beam based on a combination of factors including a time at which the initial laser beam is emitted, a time at which the TDC device is triggered, a sampling rate of the MPPC, and a sample number corresponding to the highest MPPC count; and a processing module coupled to the MPPC and the TDC device to generate LIDAR information from the peak magnitude and a time-of-flight from the time at which the initial laser beam is emitted to the time of the peak magnitude, wherein the LIDAR information is utilized to navigate the ADV responsive to one or more obstacles detected by the LIDAR device.

2. The LIDAR device of claim 1, wherein the MPPC and the TDC device are incorporated into a single sensor.

3. The LIDAR device of claim 1, wherein the trigger threshold of the TDC corresponds to a maximum sensing range for the LIDAR device.

4. The LIDAR device of claim 1, wherein the processing module is further configured to correlate the MPPC count with an intensity value of the reflected pulse of the initial laser beam.

5. The LIDAR device of claim 4, wherein the processing module is further configured to correlate the intensity value and a time-of-flight of the reflected pulse of the initial laser beam with one or more attributes of an object that reflected the pulse of the initial laser beam.

6. An autonomous driving vehicle (ADV), comprising:
a light detection and range (LIDAR) device, wherein the LIDAR device comprises:
a laser transmitter to emit an initial laser beam;
a time-to-digital conversion (TDC) device to be triggered at a trigger threshold;
a multi-pixel photon counter (MPPC) having an array of single photon avalanche diodes (SPADs), each SPAD having an output of 0 or 1, wherein each SPAD in the array of SPADs has a probability of outputting a 1 that is dependent upon an intensity of light received and a configured trigger level corresponding to a maximum sensing distance range for each SPAD in the array of SPADs, wherein the MPPC is to output an analog signal corresponding to an MPCC count representing a summation of an output of 0's and 1's of all SPADs in the MPPC for each reflected pulse of the initial laser beam, and starts sampling and storing the MPCC count when the analog signal exceeds the trigger threshold of the TDC device to trigger the TDC device and stops sampling and storing the MPCC count when the analog signal falls below falls below the trigger threshold, wherein the MPPC is to determine a highest MPPC count of the sampled and stored MPPC counts as a peak magnitude of a reflection of the initial laser beam, wherein the TDC device is to determine a time of the peak magnitude of the reflection of the initial laser beam based on a combination of factors including a time at which the initial laser beam is emitted, a time at which the TDC device is triggered, a sampling rate of the MPPC, and a sample number corresponding to the highest MPPC count; and a processing module coupled to the MPPC and the TDC device to generate LIDAR information from the peak magnitude and a time-of-flight from the time at which the initial laser beam is emitted to the time of the peak magnitude;

a perception and planning system coupled to the LIDAR device and configured to utilize the LIDAR information to navigate the ADV responsive to one or more obstacles detected by the LIDAR device.

7. The ADV of claim 6, wherein the processing module is further configured to correlate the MPPC count with an intensity value of the reflected pulse of the initial laser beam.

8. A computer-implemented method, practiced on a LIDAR device comprising a laser emitter, an multi-pixel photon counter (MPPC), a time-to-digital conversion (TDC) device, and a processing module, the method comprising:
emitting an initial laser beam by the laser emitter;
measuring, by the MPPC, a peak magnitude of a reflection of the initial laser beam, wherein MPPC comprises an array of single photon avalanche diodes (SPADs), each SPAD having an output of 0 or 1, wherein each SPAD in the array of SPADs has a probability of outputting a 1 that is dependent upon an intensity of light received and a configured trigger level corresponding to a maximum sensing distance range for the each SPAD in the array of SPADs, wherein the MPPC is to output an analog signal corresponding to an MPCC count representing a summation of an output of 0's and 1's of all SPADs in the MPPC for each reflected pulse of the initial laser beam, and starts sampling and storing the MPCC count when the analog signal exceeds the trigger threshold of the TDC device to trigger the TDC device and stops sampling and storing the MPCC count when the analog signal falls below falls below the trigger threshold, wherein the MPPC is to determine a highest MPPC count of the sampled and stored MPPC counts as a peak magnitude of a reflection of the initial laser beam;
determining, by the TDC device having a configurable trigger threshold, a time of the peak magnitude of the reflection of the initial laser beam based on a combination of factors including a time at which the initial laser beam is emitted, a time at which the TDC device is triggered, a sampling rate of the MPPC, and a sample number corresponding to the highest MPPC count; and
generating LIDAR information from the peak magnitude, and a time-of-flight from the time at which the initial laser beam is emitted to the time of the peak magnitude, wherein the LIDAR information is utilized to navigate an autonomous driving vehicle (ADV) responsive to one or more obstacles detected by the LIDAR.

9. The method of claim 8, further comprising:
correlating the MPPC account with an intensity value of the reflected pulse of the initial laser beam.

10. The method of claim 9, further comprising:
correlating the intensity value and a time-of-flight of the reflected pulse of the initial laser beam with one or more attributes of an object that reflected the pulse of the initial laser beam.

11. The method of claim 8, wherein the MPPC and the TDC device are incorporated into a single sensor.

12. The method of claim 8, wherein the trigger threshold of the TDC corresponds to a maximum sensing range for the LIDAR device.

13. The ADV of claim 7, wherein the processing module is further configured to correlate the intensity value and a time-of-flight of the reflected pulse of the initial laser beam with one or more attributes of an object that reflected the pulse of the initial laser beam.

14. The ADV of claim 6, wherein the MPPC and the TDC device are incorporated into a single sensor.

15. The ADV of claim 6, wherein the trigger threshold of the TDC corresponds to a maximum sensing range for the LIDAR device.

* * * * *